United States Patent [19]

Takanashi et al.

[11] Patent Number: 5,130,826
[45] Date of Patent: Jul. 14, 1992

[54] OPTICAL SYSTEM HAVING PHOTOCONDUCTIVE MEMBERS AND OPTICAL MEANS FOR DECOMPOSING AND COMPOSING THE POLARIZED LIGHTS FOR A COLOR PICTURE DISPLAY

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokohama, Japan

[21] Appl. No.: 679,602

[22] Filed: Apr. 3, 1991

[30] Foreign Application Priority Data

Apr. 4, 1990 [JP] Japan ................... 2-89777

[51] Int. Cl.$^5$ .................. G02F 1/13; H04N 9/13
[52] U.S. Cl. .......................... 359/40; 359/66; 359/72; 359/93; 358/61
[58] Field of Search ............... 350/338, 331 R, 345, 350/339 F; 353/33 A, 23, 34, 122; 358/33, 43, 60, 61, 230; 359/40, 41, 42, 71, 72, 93, 66, 48, 70

[56] References Cited

U.S. PATENT DOCUMENTS

| | | | |
|---|---|---|---|
| 4,461,542 | 7/1984 | Gagnon | 350/331 R |
| 4,690,526 | 9/1987 | Ledebuhr | 350/331 R X |
| 4,786,146 | 11/1988 | Ledebuhr | 350/331 R |
| 4,904,061 | 2/1990 | Aruga | 350/339 F |
| 4,909,601 | 3/1990 | Yajima et al. | 350/331 R |
| 4,989,076 | 1/1991 | Owada et al. | 358/61 |
| 4,995,702 | 2/1991 | Aruga | 350/331 R |
| 5,028,121 | 7/1991 | Baur et al. | 350/331 R |
| 5,046,828 | 9/1991 | Takanashi et al. | 359/72 |
| 5,067,799 | 11/1991 | Gold et al. | 358/61 |

OTHER PUBLICATIONS

Ledebuhr, "Full-Color Single-projection-lens liquid Crystal light valve projector", SID 86 Digest, 1986, pp. #379-382.

*Primary Examiner*—Stanley D. Miller
*Assistant Examiner*—Huy K. Mai
*Attorney, Agent, or Firm*—Michael N. Meller

[57] ABSTRACT

There is disclosed an optical system for a color picture display having three spatial light modulators of reflecting type corresponding to an optical image of one of three primary colors by photoelectric effect and photomodulation effect, a writing device for guiding writing lights each carrying the optical image of one of the colors to each device, a reading device for guiding reading lights each in the region of wavelength of one of the colors to each device and a composing device for composing a composed reading light of the reading lights which are emitted from the optical devices respectively after optically modulated. The optical system comprises an optical apparatus shared by the reading device and the composing device, having first, second and third prisms, a first dichroic filter provided between the first and the second prisms and a second dichroic filter provided between the second and the third prisms.

2 Claims, 6 Drawing Sheets

OPTICAL SYSTEM HAVING PHOTOCONDUCTIVE MEMBERS AND OPTICAL MEANS FOR DECOMPOSING AND COMPOSING THE POLARIZED LIGHTS FOR A COLOR PICTURE DISPLAY

BACKGROUND OF THE INVENTION

The present invention relates to an optical system for a color picture display.

A known color picture display, such as disclosed in "SID International Symposium Digest of Technical Papers", pp. 379-382, 1986, Palisade Institute for Research Service Inc., illuminates three spatial light modulators of the reflecting type which receive optical images obtained by subjecting a color picture to be displayed to color separation as writing lights, respectively, by reading lights of different wavelengths in predetermined wavelength bands, respectively, transmitted through a dichroic mirror, and composes the reading lights reflected by the three spatial light modulators of the reflecting type by the dichroic mirror to display the color picture.

This known color picture display produces the reading lights of different wavelengths in the predetermined wavelength bands, respectively, to be applied to the three spatial light modulators of the reflecting type by the dichroic mirror, and displays the color picture by composing the reading lights reflected by the three spatial light modulators of the reflecting type by the dichroic mirror. However, when the light which is composed of the reading lights by the dichroic mirror is projected on a screen by a projecting lens, the optical path between the projecting lens and the screen become long, the color picture display has a comparatively large construction.

SUMMARY OF THE INVENTION

The present invention provides an optical system for use in combination with a color picture display having three spatial light modulators of reflecting type corresponding to an optical image of one of three primary colors produced by photoelectric effect and by photomodulation effect, writing means for guiding writing lights each carrying the optical image of one of the colors to each device, reading means for guiding reading lights each in the region of wavelength of one of the colors to each device and composing means for composing a composed reading light of the reading lights which are emitted from the devices respectively after being optically modulated.

The optical system comprises optical means shared by the reading means and the composing means, having first, second and third prisms, a first dichroic filter provided between the first and the second prisms and a second dichroic filter provided between the second and the third prisms.

The reading lights of wavelengths in the predetermined wavelength bands are projected, through the optical means (a three-color separation prism), on three optical devices (spatial light modulators of reflecting type) which receive optical images of three primary colors of a color picture to be displayed as writing lights, respectively.

The three-color separation prism SCA which is used for the three-color separation of the optically modulated reading lights emitted from the spatial light modulators of the reflecting type functions as a three-color composing prism for composing the three-color composition of the reading lights.

The length of an optical path between the projecting lens and the screen of the optical system of the present invention for a color picture display is shorter than that of the conventional optical system employing a dichroic mirror for three-color separation and three-color composition, so that the color picture display employing the optical system of the present invention can be constructed in comparatively small dimensions.

DETAILED DESCRIPTION OF THE PREFERRED EMBODIMENTS

Optical systems in preferred embodiments according to the present invention for a color picture display will be described hereinafter with reference to the accompanying drawings.

Throughout the drawings, like reference numerals and letters are used to designate like or equivalent elements for the sake of simplicity of explanation.

First the construction and operation of a spatial light modulator of the reflecting type will be described with reference to FIGS. 1 and 2. Spatial light modulators $SLM_1$ and $SLM_2$ each comprise electrodes Et1 and Et2, a photoconductive layer PCL, a dielectric mirror layer DML for reflecting a reading light RL, and a photomodulation layer PML, such as a layer of a single crystal of lithium niobate, a liquid crystal layer, a composite polymer-liquid crystal film, PLZT (Lead Lanthanum Zirconate Titanate) or the like. The microchannel spatial light modulator $SLM_1$ shown in FIG. 1 is provided with a shading film SM to shade the read side from a writing light WL for writing an optical image as a charge image on the microchannel spatial light modulator $SLM_1$ and to shade the write side from a reading light RL for reading the charge image formed on the spatial light modulator $SLM_1$.

The electrode Et1 is capable of transmitting the writing light WL, and the electrode Et2 is capable of transmitting the reading light RL.

Figure 1:
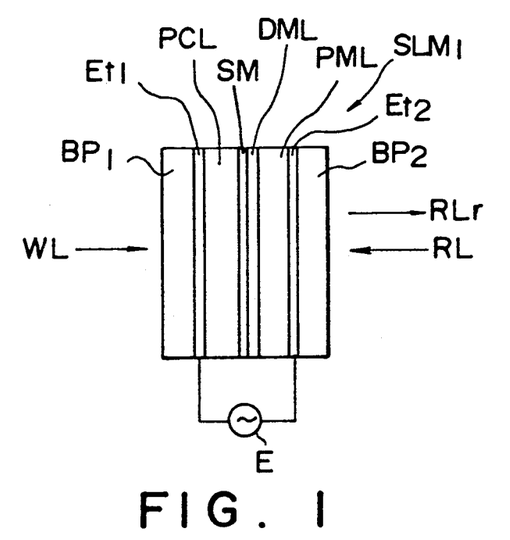
FIGS. 1 and 2 are sectional side views of a spatial light modulator of the reflecting type.
Figure 2:
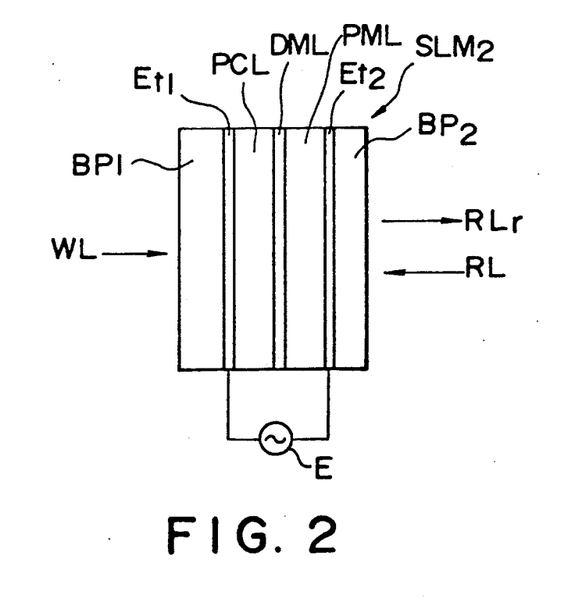

When the electrodes Et1 and Et2 of each of the spatial light modulators $SLM_1$ and $SLM_2$ shown in FIGS. 1 and 2 are connected to a power supply E to apply an electric field across the photoconductive layer PCL, and the writing light WL is projected on the electrode Et1, the writing light WL travels through the electrode Et1 and falls on the photoconductive layer PCL.

The electrical resistance of the photoconductive layer PCL is dependent on the intensity of the writing light WL. Therefore, in the spatial light modulator $SLM_1$ or $SLM_2$ shown in FIGS. 1 and 2, the image of a resistivity distribution corresponding to the intensity distribution of the writing light WL applied to the photoconductive layer PCL is formed in the photoconductive layer PCL. Thus, an effective electric field is applied to the photomodulation layer PML which varies in accordance with an image applied to the photoconductive layer PCL. The reading light RL is reflected by the dielectric mirror DML, transmitted again through the photomodulation layer PML, and then emitted from the electrode Et2. If the photomodulation layer PML acts in a double refraction mode, a reading light RLr, resulting from the change of the plane of polarization of the reading light (linearly polarized light) RL according to the effective electric field applied to the photomodulation layer PML, is emitted from the electrode Et2. If the photomodulation layer PML acts in a scattering mode, a reading light RLr, resulting from the change of the intensity of the reading light RL (which may be a randomly polarized light) according to the effective electric field applied to the photomodulation layer, PML is emitted from the electrode Et2.

Accordingly, as stated above, the condition of the reading light RLr emitted from the electrode Et2 changes according to the effective electric field applied to the photomodulation layer PML this effective electrical field results from the charge of the resistivity induced in the photoconductive layer PCL by the writing light WL.

Optical systems in accordance with the present invention shown in FIGS. 3 to 5 for a color picture display will be described hereinafter.

In each of FIGS. 3 to 6, indicated by SLMr, SLMg and SLMb are spatial light modulators of the reflecting type (light-to-light conversion elements). The suffixes "r", "g" and "b" indicate the correspondence of the spatial light modulators respectively with a red image, a green image and a blue image of an optical image to be displayed written in the spatial light modulators by the and writing light WL. In the following description, the spatial light modulators SLMr, SLMg and SLMb are denoted inclusively by SLM if described without distinction.

Figure 3:
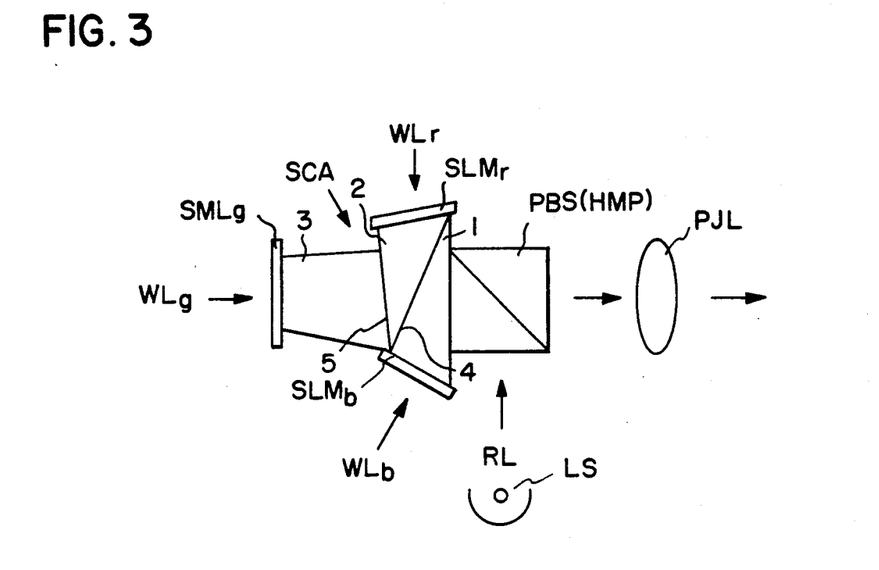
FIGS. 3 to 6 are block diagrams of optical systems in preferred embodiments according to the present invention for a color picture display.
Figure 4:
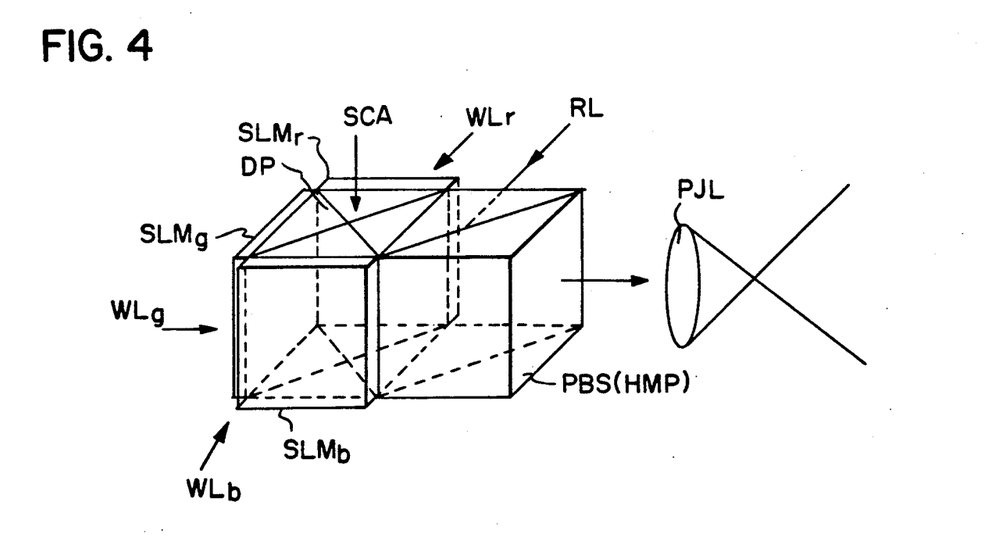
Figure 5:
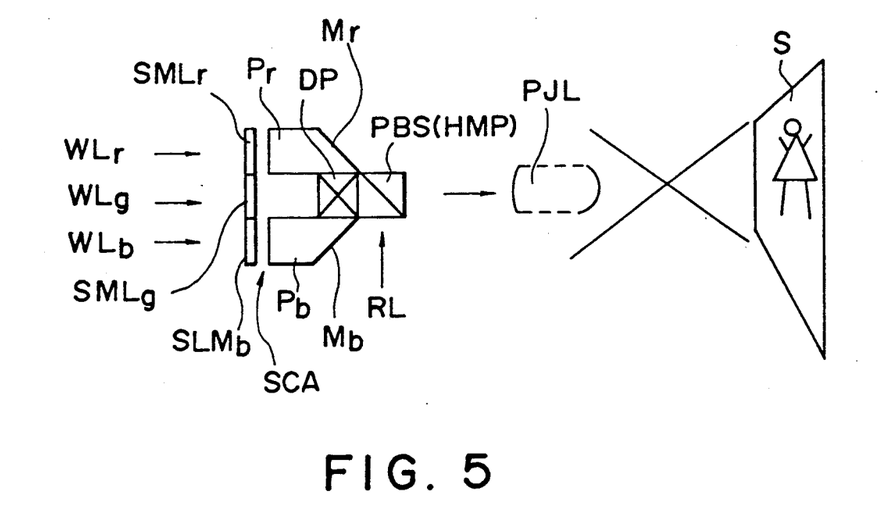

Optical systems in accordance with the present invention shown in FIGS. 3 to 5 for a color picture display are provided each with a beam splitter. When the spatial light modulators SLM act in a double refraction mode, a polarizing beam splitter PBS is employed. When the spatial light modulators SLM act in the scattering mode, a semitransparent mirror HMP is employed.

The optical system shown in FIG. 3 is provided with a three-color separation optical system. The three-color separation optical system is a three-color separation prism SCA of a known configuration comprising three prisms 1, 2 and 3, a dichroic filter 4 provided in the interface between the prism 1 and the prism 2, and a dichroic filter 5 provided in the interface between the prisms 2 and 3. A reading light RL is projected from a light source LS on the prism 1 through the polarizing beam splitter PBS or the semitransparent mirror HMP.

When the spatial light modulators SLMr, SLMg and SLMb of the optical system shown in FIG. 3 act in the double refraction mode, the polarizing beam splitter PBS receives the reading light RL and a linearly polarized light thereof having a specific plane of polarization (S-polarized light) is reflected there and incident to the prism 1. (Note: P-polarized light described later is a linearly polarized light of which the plane of polarization is perpendicular to the plane of incidence of the light before the conversion, whereas the S-polarized light is a linearly polarized light of which the plane of polarization is perpendicular to the P-polarized light.) A light of wavelength in the region of green (hereinafter called a green light) included in the linearly polarized light is transmitted through both the dichroic filters 4 and 5 and falls on the spatial light modulator SLMg provided on the end surface of the prism 3. A light of wavelength in the region of red (hereinafter called a red light) included in the linearly polarized light is transmitted through the dichroic filter 4, is reflected by the dichroic filter 5 and falls on the spatial light modulator SLMr provided on the end surface of the prism 2. A light of wavelength in the region of blue (hereinafter called a blue light) included in the linearly polarized light RL is reflected by the dichroic filter 4 and falls on the spatial light modulator SLMb provided on the end surface of the prism 1.

The planes of polarization of the red, green and blue lights respectively outgoing from the spatial light modulators SLMr, SLMg and SLMb are changed by electric fields created by the charge images written in the spatial light modulators SLMr, SLMg and SLMb, respectively while the red, green and blue lights are incident to the photomodulation layers PML of the spatial light modulators SLMr, SLMg and SLMb, respectively. The red light outgoing from the spatial light modulator SLMr is reflected by the dichroic filter 5, is transmitted through the dichroic filter 4 and falls on the polarizing beam splitter PBS, and then the P-polarized component of the red light is transmitted through the polarizing beam splitter PBS and falls on a projection lens PJL. The green light outgoing from the spatial light modulator SLMg is transmitted through both the dichroic filters 5 and 4 and falls on the polarizing beam splitter PBS, and then the P-polarized component of the green light is transmitted through the polarizing beam splitter PBS and falls on the projection lens PJL. The blue light outgoing from the spatial light modulator SLMb is reflected by the dichroic filter 4 and falls on the polarizing beam splitter PBS, and then the P-polarized component of the blue light is transmitted through the polarizing beam splitter PBS and falls on the projection lens PJL.

Thus, all the P-polarized components transmitted through the polarizing beam splitter PBS and fallen on the projection lens PJL together compose a light corresponding to the color picture to be displayed of the red, green and blue lights provided respectively by the spatial light modulators SLMr, SLMg and SLMb. The composed light has undergone the intensity changing action of the polarizing beam splitter PBS and is projected on a screen as an optical image corresponding to the color picture.

Figure 7:
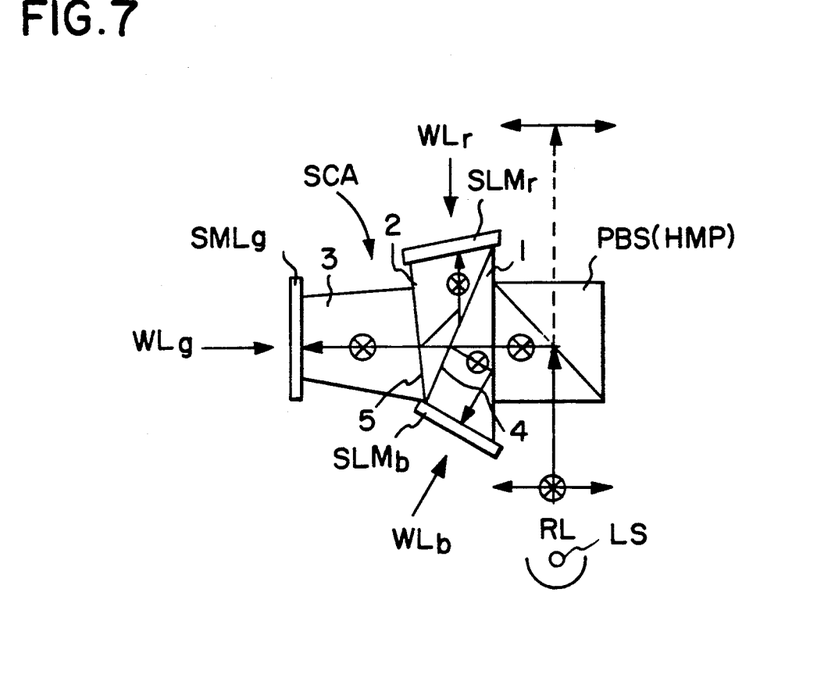
FIGS. 7 and 8 are views showing the condition of the planes of polarization of the reading lights RL with respect to FIG. 3.
Figure 8:
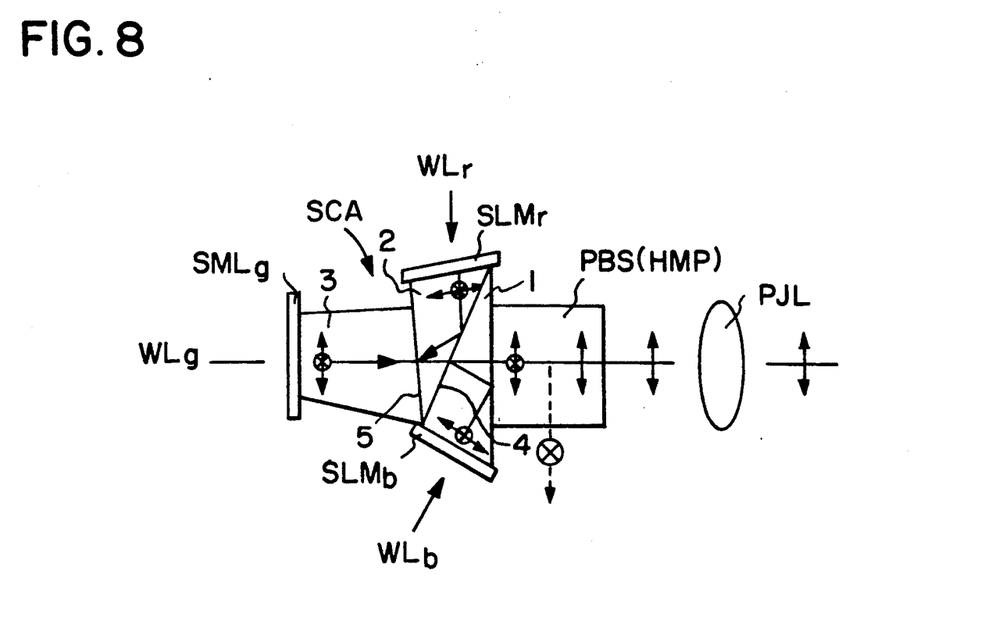

FIGS. 7 and 8 respectively show the condition of the planes of polarization of the reading lights RL incident to and outgoing from the optical system shown in FIG. 3. In the figures, ↑ ↓ denotes the P-polarized light, while ⊗ the S-polarized light.

In FIG. 7, when the reading light RL is incident to the polarizing beam splitter PBS, the P-polarized light of the reading light L is transmitted therethrough. The S-polarized light of the reading light RL is reflected by the polarized beam splitter PBS, is incident to the prism SCA and falls on each of the spatial light modulators SLMr, SLMg and SLMb without changing the planes of polarization.

In FIG. 8, the S-polarized light outgoing from each of the spatial light modulators SLMr, SLMg and SLMb is converted into a P-polarized light including some S-polarized light components. The P-polarized light is transmitted through the polarization beam splitter PBS and falls on the projection lens PJL, while the S-polarized light components are reflected by the polarization beam splitter PBS.

When the spatial light modulators SLMr, SLMg and SLMb of the optical system shown in FIG. 3 act in the scattering mode, a randomly polarized light is used as the read light RL and a semitransparent mirror HMP is used instead of the polarizing beam splitter PBS adopted in the case of a polarized reading light.

A green light included in the randomly polarized light reflected by the semitransparent mirror HMP toward the prism 1 is transmitted through both the dichroic filters 4 and 5 and falls on the spatial light modulator SLMg provided on the end surface of the prism 3. A red light included in the randomly polarized light is transmitted through the dichroic filter 4, is reflected by the dichroic filter 5 and falls on the spatial light modulator SLMr provided on the end surface of the prism 2. A blue light included in the randomly polarized light is reflected by the dichroic filter 4 and falls on the spatial light modulator SLMb provided on the end surface of the prism 1.

Since charge images corresponding respectively to red, green and blue optical images of the color picture are written in the spatial light modulators SLMr, SLMg and SLMb by writing lights Wr, Wg and Wb, the spatial light modulators SLMr, SLMg and SLMb provide lights modulated by the picture information written as the charge images when the red, green and blue lights are respectively projected on the spatial light modulators SLMr, SLMg and SLMb by the three-color separation prism SCA.

The respective intensities of the red, green and blue lights provided by the spatial light modulators SLMr, SLMg and SLMb are changed by electric fields created by the electrostatic latent images written in the SLMr, SLMg and SLMb while the red, green and blue lights are incident to the photomodulation layers PML of the spatial light modulators SLMr, SLMg and SLMb, respectively. The red light outgoing from the spatial light modulator SLMr is reflected by the dichroic filter 5, is transmitted through the dichroic filter 4 and falls on the semitransparent mirror HMP, and then a component of the red light transmitted through the semitransparent mirror HMP falls on the projection lens PJL. The green light outgoing from the spatial light modulator SLMg is transmitted through both the dichroic filters 5 and 4 and falls on the semitransparent mirror HMP, and then a component of the green light transmitted through the semitransparent mirror HMP falls on the projection lens PJL. The blue light outgoing from the spatial light modulator SLMb is reflected by the dichroic filter 4 and falls on the semitransparent mirror HMP, and then a component of the blue light transmitted through the semitransparent mirror HMP falls on the projection lens PJL.

All the components thus transmitted through the semitransparent mirror HMP and fallen on the projection lens PJL together compose a light of the red, green and blue lights provided by the spatial light modulators SLMr, SLMg and SLMb by the three-color separation prism SCA and corresponds to the color picture. The composed light is projected on the screen in an optical image corresponding to the color picture.

Figure 9:
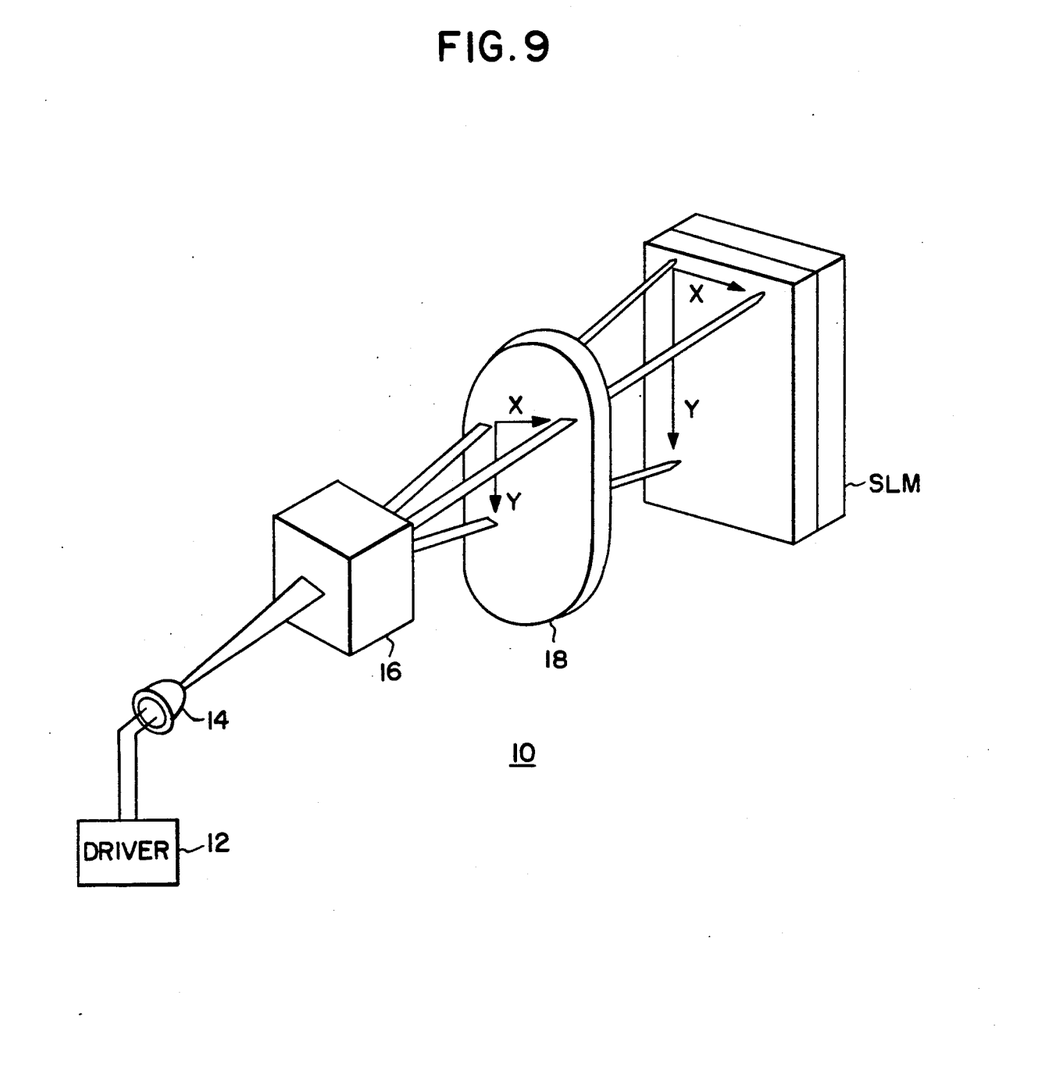
FIG. 9 is a pictorial view of a writing light guide device used in the preferred embodiments shown in FIGS. 3 to 6.

FIG. 9 shows a writing light guide device 10 including a driver 12, a laser 14 driven by the driver 12 and a deflector 16 for deflecting a laser beam emitted from the laser 14 in X-Y directions. The guide device 10 also has a lens 18 on which a deflected laser beam is converged. The deflected laser beam then makes a spot on a spatial light modulator SLM at a photo modulation layer side thereof shown in FIGS. 3 to 6.

Optical systems shown in FIGS. 4 and 5 for a color picture display are the same in construction as the optical system shown in FIG. 3, except that a three-color separation prism SCA as the color separation optical systems shown in FIGS. 4 and 5 is different from the three-color separation prism employed in the optical system shown in FIGS. 3.

The three-color separation prism SCA employed as the color separation optical system shown in FIG. 4 comprises a dichroic prism DP. The reading light RL transmitted through a polarizing beam splitter PBS or a semitransparent mirror HMP and fallen on the dichroic prism DP is separated into red, green and blue lights by the dichroic prism DP. The red, green and blue lights fall on the spatial light modulators SLMr, SLMg and SLMb, respectively.

The optical system shown in FIG. 5 for a color picture display employs the three-color separation prism SCA as the color separation optical system comprising a dichroic prism DP and light path length correction prisms Pr and Pb. In FIG. 5, indicated at Mr and Mb are total reflection surfaces.

The dichroic prism DP separates the reading light RL transmitted through a polarizing beam splitter PBS or a semitransparent mirror HMP into red, green and blue lights. The red light falls through the prism Pr on the spatial light modulator SLMr, the green light falls on the spatial light modulator SLMg, and the blue light falls through the prism Pb on the spatial light modulator SLMb.

The three-color separation prism SCA functions satisfactorily in reading image information from the three spatial light modulators SLMr, SLMg and SLMb arranged side by side on a plane.

The mode of picture information read operation of the optical systems shown in FIGS. 4 and 5 by using the reading light RL when the spatial light modulators SLMr, SLMg and SLMb act in the double refraction mode, and the mode of picture information read operation of the optical systems shown in FIGS. 4 and 5 by using the reading light RL when the spatial light modulators SLMr, SLMg and SLMb act in the scattering mode are the same as the modes of picture information read operation of the optical system shown in FIG. 3 by using the reading light RL under the same operating modes of the spatial light modulators SLMr, SLMg and SLMb, respectively, and hence the description thereof will be omitted.

Figure 6:
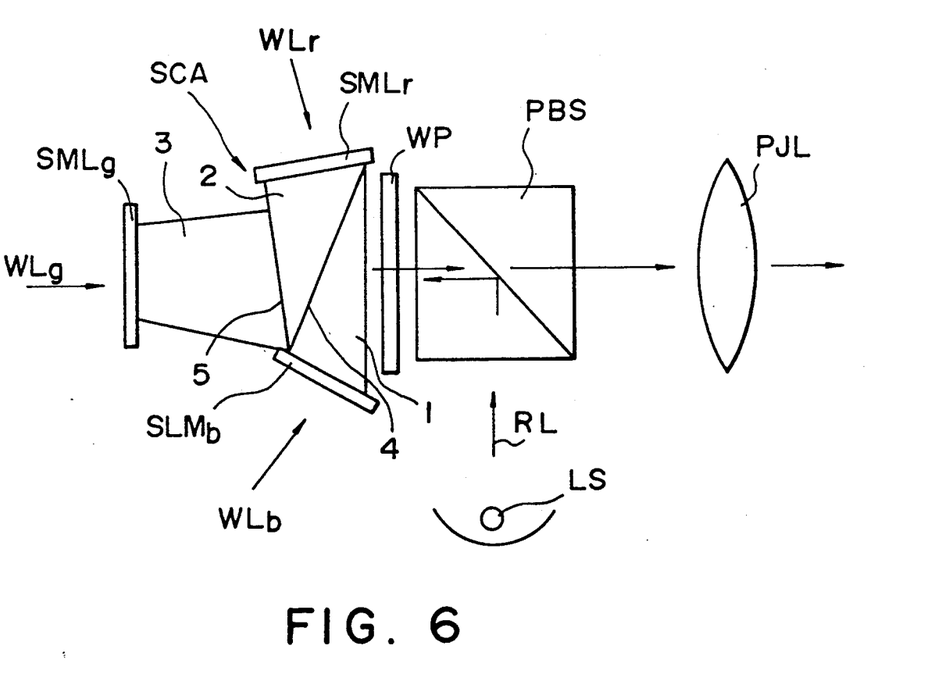

An optical system shown in FIG. 6 for a color picture display comprises a polarizing beam splitter PBS, a three-color separation prism SCA having prisms 1, 2 and 3, a quarter wave plate WP provided between the polarizing beam splitter PBS and the prism 1, and spatial light modulators SLMr, SLMg and SLMb that act in the scattering mode.

The optical system shown in FIG. 3 employs the semitransparent mirror HMP when the spatial light modulators SLMr, SLMg and SLMb act in the scattering mode, and hence only a quarter of the quantity of light applied to the semitransparent mirror HMP by the light source is used effectively. The optical system shown in FIG. 6 employs the polarizing beam splitter PBS to improve such a disadvantage.

Referring to FIG. 6, when a light source LS projects a reading light RL on the polarizing beam splitter PBS, a linearly polarized reading light having a specific plane of polarization (S-polarized light) is reflected toward and falls on the quarter wave plate WP.

A circularly polarized reading light transmitted through the quarter wave plate WP falls on the prism 1. A green light included in the circularly polarized reading light is transmitted through dichroic filters 4 and 5 and falls on the spatial light modulator SLMg provided on the end surface of the prism 3. A red light included in the circularly polarized reading light is transmitted through the dichroic filter 4, is reflected by the dichroic filter 5 and falls on the spatial light modulator SLMr provided on the end surface of the prism 2. A blue light included in the circularly polarized reading light is reflected by the dichroic filter 4 and falls on the spatial light modulator SLMb provided on the end surface of the prism 1.

Since images respectively corresponding to the red, green and blue optical images of a color picture are written in the spatial light modulators SLMr, SLMg and SLMb, which act in the scattering mode, by writing lights Wr, Wg and Wb, respectively, the spatial light modulators SLMr, SLMg and SLMb provide circularly polarized reading lights of intensities modulated according to picture information written in the spatial light modulators SLMr, SLMg and SLMb upon the reception of the red, green and blue lights, respectively.

The circularly polarized red light provided by the spatial light modulator SLMr is reflected by the dichroic filter 5, is transmitted through the dichroic filter 4, is converted into a P-polarized light by the quarter wave plate WP, travels through the polarizing beam splitter PBS and falls on a projection lens PJL. The circularly polarized green light provided by the spatial light modulator SLMg is transmitted through both the dichroic filters 5 and 4, is converted into a P-polarized light by the quarter wave plate WP, travels through the polarizing beam splitter PBS and falls on the projection lens PJL. The circularly polarized blue light provided by the spatial light modulator SLMb is reflected by the dichroic filter 4, is converted into a P-polarized light by the quarter wave plate WP travels through the polarizing beam splitter PBS and falls on the projection lens PJL.

Figure 10:
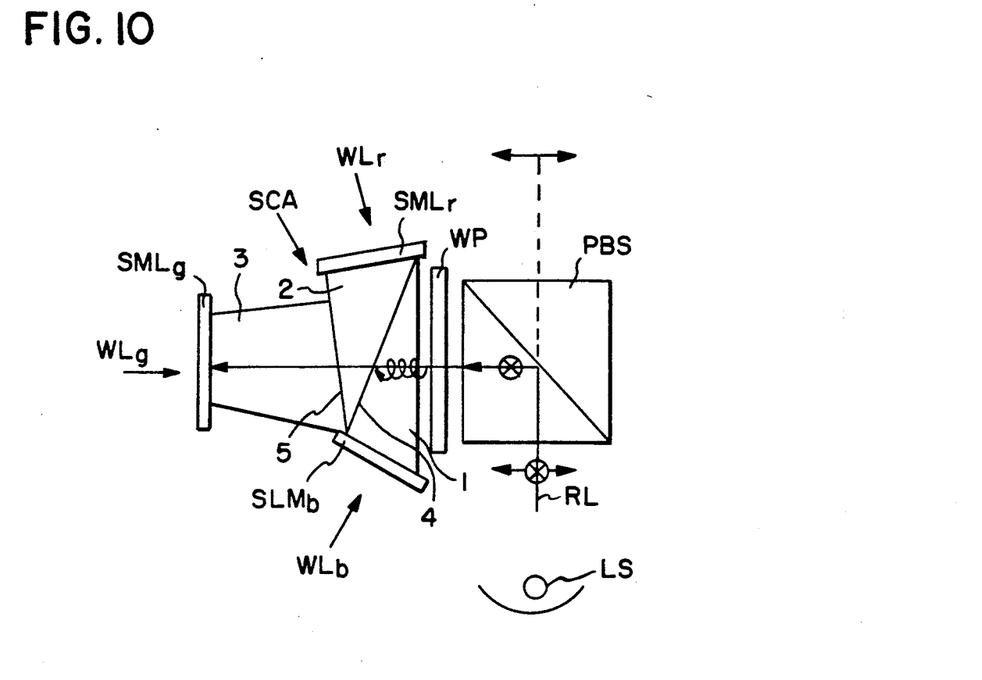
FIGS. 10 and 11 are views showing the condition of the planes of polarization of the reading lights RL with respect to FIG. 6.
Figure 11:
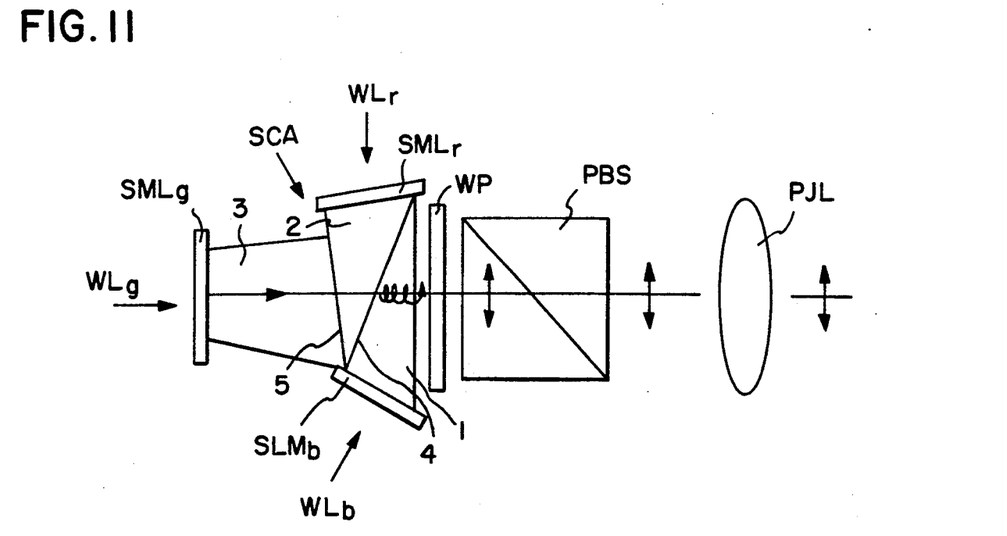

FIGS. 10 and 11 respectively show the condition of the planes of polarization of the reading lights RL incident to and outgoing from the optical system shown in FIG. 6.

In FIG. 10, the same as described with reference to FIG. 8, the S-polarized light of the reading light RL is reflected by the polarization beam splitter PBS. The S-polarized light is then incident to the quarter wave plate WP and converted into a circularly polarized light which is incident to each of the spatial light modulators SLMr, SLMg and SLMb, through the prism SCA.

In FIG. 11, the circularly polarized light intensity-modulated by each of the spatial light modulators SLMr, SLMg and SLMb revolves in an opposite direction of the revolution of the circularly polarized light incident to each spatial light modulators. Accordingly, the circularly polarized light outgoing from the prism SCA is incident to the quarter wave plate WP and converted into the P-polarized light. The P-polarized light is then transmitted through the polarization beam splitter PBS. In FIGS. 10 and 11, the reading light for blue only is indicated for the sake of simplicity of explanation.

The efficiency of utilization of the reading light RL emitted by the light source LS in the optical system shown in FIG. 6 is twice as large as the efficiency of utilization of the reading light RL in the optical system shown in FIG. 3 provided with the spatial light modulators SLMr, SLMg and SLMb which act in the scattering mode, and the semitransparent mirror HMP for dividing the reading light RL.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical system for a color picture display having three optical devices each including a photoconductive member in which an optical image of one of three primary colors is written as a charge image by photoelectric effect and a photomodulation member having a composite polymer-liquid crystal acting in a scattering mode which reproduces the optical image by photo modulation of said liquid crystal, writing means for guiding writing lights each carrying an optical image of one of the colors to each device, a light source for emitting a light having P- and S-polarized lights, optical means for decomposing the S-polarized light to three reading lights each in a region of wavelength of one of the colors and guiding respectively the reading lights to each device and for composing a composed reading light of the reading lights which are emitted from the devices respectively after being optically modulated by said liquid crystal, comprising:

beam splitting means for reflecting said S-polarized light of the light emitted from said light source toward said optical means; and beam separation means for rotating a plane of polarization of said polarized light which is reflected towards said optical means by said beam splitting means, before said S-polarized light is decomposed by said optical means, said S-polarized light thus becoming a circularly polarized light and a plane of polarization of the reading light which is composed by said optical means, said composed light thus becoming a P-polarized light.

2. An optical system according to claim 1, wherein said optical means comprises:

a first prism for allowing to pass therethrough the S-polarized light reflected by said beam splitting means and said composed reading light;

a first dichroic filter for decomposing a first reading light in a region of wavelength of a first color of the three primary colors from the P-polarized light which is allowed to pass through said first prism and guiding said first reading light thus decomposed to a first device of said three optical devices, said first device being written with an optical image of said first color;

a second prism for allowing to pass therethrough second and third reading lights in regions of wavelength of second and third colors of the three primary colors, respectively;

a second dichroic filter for decomposing the second reading light which is allowed to pass through said second prism and guiding said second reading light thus decomposed to a second device of said three optical devices, said second device being written with an optical image of said second color; and a third prism for allowing to pass therethrough the third reading light which is allowed to pass through said second prism and guiding the third reading light thus allowed to pass through said third prism to a third device of said three optical devices, said third device being written with an optical image of said third color.

* * * * *